United States Patent
Yang

(10) Patent No.: US 8,402,509 B2
(45) Date of Patent: Mar. 19, 2013

(54) USER AUTHENTICATION APPARATUS AND METHOD THEREOF

(75) Inventor: Pil-seung Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 341 days.

(21) Appl. No.: 12/416,972

(22) Filed: Apr. 2, 2009

(65) Prior Publication Data

US 2010/0005508 A1    Jan. 7, 2010

(30) Foreign Application Priority Data

Jul. 4, 2008    (KR) .................. 10-2008-0064805

(51) Int. Cl.
*H04L 9/32*    (2006.01)

(52) U.S. Cl. ............ 726/2; 713/168; 380/270; 345/418; 702/19

(58) Field of Classification Search .................. None
See application file for complete search history.

(56) References Cited

U.S. PATENT DOCUMENTS

| | | | |
|---|---|---|---|
| 7,623,970 B2 * | 11/2009 | Kondo et al. | 702/19 |
| 2002/0141586 A1 * | 10/2002 | Margalit et al. | 380/270 |
| 2006/0294388 A1 * | 12/2006 | Abraham et al. | 713/182 |
| 2008/0117201 A1 * | 5/2008 | Martinez et al. | 345/418 |
| 2008/0289030 A1 * | 11/2008 | Poplett | 726/15 |

* cited by examiner

*Primary Examiner* — Fikremariam A Yalew

(74) *Attorney, Agent, or Firm* — Sughrue Mion, PLLC

(57) ABSTRACT

A user authentication apparatus includes an information collection unit which collects user information from a plurality of personal portable devices of a user within a predetermined distance, and a control unit which identifies the user as a user corresponding to the collected information based on the amount of user information collected. Accordingly, user authentication can be easily performed using portable devices of a user, resulting in increased user convenience.

21 Claims, 3 Drawing Sheets

USER AUTHENTICATION APPARATUS AND METHOD THEREOF

CROSS-REFERENCE TO RELATED APPLICATIONS

This application claims priority from Korean Patent Application No. 10-2008-0064805, filed on Jul. 4, 2008 in the Korean Intellectual Property Office, the disclosure of which is incorporated herein by reference in its entirety.

BACKGROUND OF THE INVENTION

1. Field of the Invention

Apparatuses and methods consistent with the present invention relate to user authentication, and more particularly, to user authentication which identifies a user using user information of personal portable devices.

2. Description of the Related Art

Various kinds of user authentication apparatuses and methods have been suggested to allow only authorized users to access systems, resources or applications. In general, for user authentication, an authentication key, a card key, or a password have been used. However, authentication methods using an authentication key or a card key may increase inconvenience since a user needs to take the key, and an authentication method using a password possesses a risk of leaking the password to unauthorized users.

In order to solve such problems, authentication methods using biometric recognition such as voice recognition, facial recognition, fingerprint recognition, iris recognition, and vein recognition have been introduced. However, authentication methods using voice recognition and facial recognition may have a high possibility of errors in authentication while employing comparatively simple structure, and authentication methods using fingerprint recognition, iris recognition, and vein recognition have comparatively few errors in authentication but require devices having complex structure.

In addition, such authentication methods using biometric recognition raise user inconvenience since the user should be in contact with or close to authentication devices. If authentication information regarding biometrics leaks, damage may be greater than in an authentication method using a password, thereby causing user aversion.

Therefore, there is a need for methods for performing user authentication more conveniently and securely.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention provides a user authentication apparatus which identifies a user using user information of personal portable devices, and a user authentication method thereof.

According to an exemplary aspect of the present invention, there is provided a user authentication apparatus including an information collection unit which collects user information from a plurality of personal portable devices of a user within a predetermined distance, and a control unit which identifies user as a user corresponding to the collected information based on an amount of user information collected.

The information collection unit may collect the user information using at least one of radio frequency identification (RFID), Bluetooth, and Zigbee.

The user information may be the same information on the user which the plurality of personal portable devices share in common, or information on the user which the plurality of personal portable devices have individually.

The information collection unit may automatically collect the user information from the plurality of personal portable devices within a detectable coverage area of the user authentication apparatus.

The control unit may apply a weight to the amount of corresponding user information according to characteristics of a personal portable device from which the user information is collected.

The user authentication apparatus may further include a user interface unit which requests additional user information if the amount of user information collected is not larger than a threshold value.

The control unit may identify the user as a user corresponding to the collected user information if the amount of user information collected is larger than a threshold value.

The user authentication apparatus may further include a storage unit which stores user authentication information representing whether or not there are permissions for each user, wherein the control unit performs user authentication by identifying the user authentication information corresponding to the identified user.

According to another exemplary aspect of the present invention, there is provided a user authentication method including collecting user information from a plurality of personal portable devices of a user within a predetermined distance, and identifying the user as a user corresponding to the collected information based on an amount of the collected user information.

The user information may be collected using at least one of radio frequency identification (RFID), Bluetooth, and Zigbee.

The user information may be the same information on the user which the plurality of personal portable devices share in common, or information on the user which the plurality of personal portable devices have individually.

The user information may be automatically collected from the plurality of personal portable devices within a detectable coverage area of the user authentication apparatus.

In identifying the user, a weight may be applied to the amount of corresponding user information according to characteristics of a personal portable device from which the user information is collected.

The user authentication method may further include requesting additional user information if the amount of user information collected is not larger than a threshold value.

The user may be identified as a user corresponding to the collected user information if the amount of user information collected is larger than the threshold value.

The user authentication method may further include performing user authentication by identifying user authentication information, representing whether or not there are permissions, corresponding to the identified user.

According to another exemplary aspect of the present invention, there is provided a computer-readable recording medium including an execution program for executing a user authentication method.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
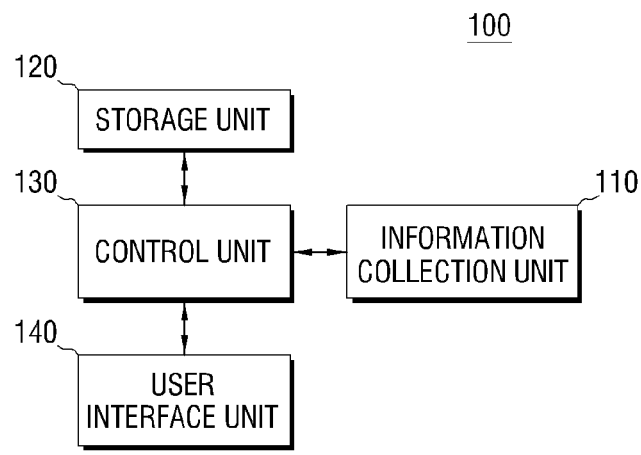
FIG. 1 is a schematic block diagram of a user authentication apparatus according to an exemplary embodiment of the present invention.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

FIG. 1 is a schematic block diagram of a user authentication apparatus according to an exemplary embodiment of the present invention.

Referring to FIG. 1, the user authentication apparatus 100 may include an information collection unit 110, a storage unit 120, a control unit 130, and a user interface unit 140.

The information collection unit 110 collects user information from personal portable devices within a certain distance of the user authentication apparatus 100. More specifically, if there is a person within a detectable coverage area of the user authentication apparatus 100, the information collection unit 110 searches for personal portable devices within the detectable coverage area and collects user information from the personal portable devices using a short range communication scheme such as radio frequency identification (RFID), Bluetooth, and Zigbee.

For example, if a person is located in front of an automated teller machine (ATM) or an entrance to a premises for user authentication, the information collection unit 110 determines that there is a user authentication request for withdrawing money from the ATM or for entering the premises. Since personal portable devices are generally carried by the user him or herself or the user's bag, the information collection unit 110 may collect user information by searching for portable devices within approximately 1 m to 2 m radius of the user or within approximately 2 m to 3 m radius of the ATM.

The user information may be information on a user which a plurality of personal portable devices share in common, or information on a user which a plurality of personal portable devices have individually. In greater detail, the user information may be information such as the cell phone number of a user as well as general information representing the user's identity such as the name, resident registration number, and employee identification number. Such user information may not be included in all of the personal portable devices. That is, a single personal portable device may include information on the user, and the remaining personal portable devices may include information indicating that the remaining personal portable devices are operated by the same user as the user of the personal portable device including the information on the user. For example, the information collection unit 110 may collect as user information portable device identification information or information on a common key between the portable devices from a single personal portable device.

For example, if a user carries personal portable devices such as a cell phone, an MPEG audio layer 3 (MP3) player, and a laptop computer, which are connected through a common key, the information collection unit 110 searches for the cell phone, the MP3 player, and the laptop computer within a predetermined distance and determines that these personal portable devices belong to the single user if the personal portable devices are connected using a common key. If the information collection unit 110 collects the cell phone number of the user from the cell phone, the user can be identified using the information.

The storage unit 120 stores user authentication information indicating the presence or absence of user authentication for each individual user. The user authentication information is information indicating whether or not access to a corresponding system is allowed. The storage unit 120 may further store general user information and information on user's preferences in addition to the user authentication information. In this exemplary embodiment of the present invention, the storage unit 120 is installed in the user authentication apparatus 100. However, the storage unit 120 may also be implemented as a separate element in which intended information is searched using an external server.

The user interface unit 140 displays a current state of authentication being processed so that the user can identify it, and receives input of user information needed for user authentication. The user interface unit 140 may include a plurality of function keys to receive input of user information and user commands, and may display whether or not user authentication is performed and user authentication being processed through a display element such as a liquid crystal display (LCD). Alternatively, the user interface unit 140 may be implemented as an audio apparatus which informs the user of authentication information using audio signals.

The control unit 130 identifies the user based on an amount of user information. More specifically, the control unit 130 determines whether or not user information collected by the information collection unit 110 is information on the corresponding user, and identifies a user corresponding to the collected user information if the amount of the collected user information is larger than a threshold value.

For example, when the user carries a cell phone and a laptop computer which include information on his or her identity, the information collection unit 110 collects user information included in the two devices, and the control unit 130 determines that the two devices are personal portable devices belonging to the same user if the collected user information shares a common authentication key or the same cell phone number. Subsequently, the control unit 130 may perform user identification by determining whether or not the amount of information is larger than a predetermined amount of information assuming that the number of pieces of user information collected from the devices or the number of personal portable devices which provide the user information is considered as the amount of information.

The amount of collected information may be determined by measuring the number of devices from which the collected information is obtained, or by applying a weight to the amount of corresponding user information according to the characteristic of a device from which the corresponding user information is collected. In greater detail, in the case of an expensive personal portable device, or a personal portable device used only by the user such as a cell phone or an RFID identification card, the amount of user information may be determined by applying a higher weight to such personal portable devices than other personal portable devices. Accordingly, the control unit 130 can measure the amount of the user information collected by the information collection unit 110, and determine if the measured amount of the collected user information is larger than the predetermined amount.

In addition, the control unit 130 may determine that a predetermined personal portable device is an indispensable personal portable device for user authentication. Accordingly, even when the amount of the collected user information is larger than the predetermined amount, if there is not the indispensable personal portable device, user authentication cannot be performed.

The control unit 130 may request additional user information. For example, the control unit 130 controls the user interface unit 140 to request additional user information if the amount of the collected user information is not larger than the threshold value. More specifically, if the amount of the collected user information is not larger than the threshold value due to temporary turning off of wireless operation of a personal portable device of the user or the existence of a personal portable device such as a magnetic card incapable of wireless communication for user information, the control unit 130 may control the user interface unit 140 to inform the user to additionally collect the user information.

If the additional user information is collected by the information collection unit 110, the control unit 130 can perform the user identification process described above using the additional user information and the previously collected user information. In addition, if the amount of user information collected by the information collection unit 110 is insufficient, the control unit 130 may perform other user authentication processes using an identification or a password.

If user identification can be performed using the sufficient amount of user information collected by the information collection unit 110, the control unit 130 can perform user authentication by identifying user authentication information pre-stored in the storage unit 120. More specifically, if the identified user has authentication, the control unit 130 can perform an operation requested by the user. As described above, the operation of the control unit 130 may vary according to the types of implementation. Since the process of performing user authentication using the pre-stored information is known well, detailed description is omitted here.

The control unit 130 may perform operation requested by the user directly based on the information collected from the personal portable devices of the user and information on the user which is pre-stored in the storage unit 120 without authentication. For example, if the user authentication apparatus 100 is a terminal device such as a personal computer accessible to the Internet, the user authentication apparatus 100 may display a personal setting screen for the user based on the collected user information, and provide the user with contents corresponding to the user based on pre-stored sex distinction and age of the user.

Figure 2:
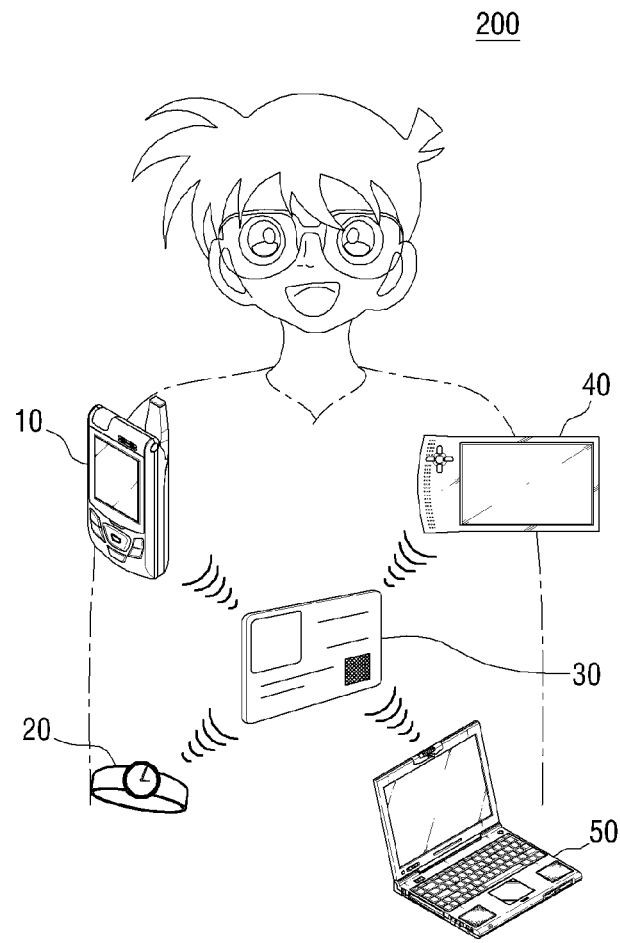
FIGS. 2 and 3 are drawings illustrating a user authentication process using a plurality of personal portable devices.
Figure 3:
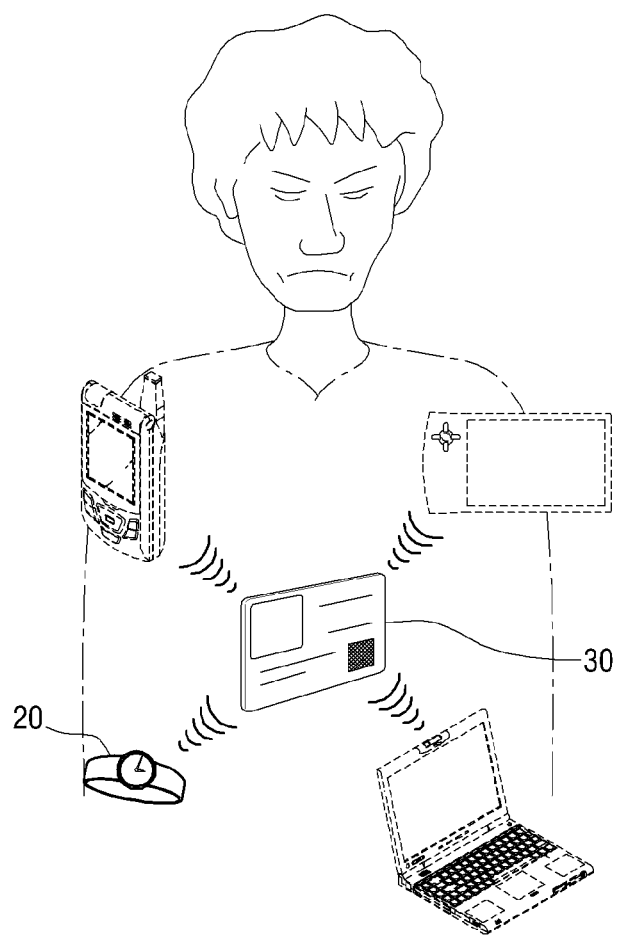

FIG. 2 illustrates user authentication by an authorized user, and FIG. 3 illustrates user authentication by an unauthorized user.

It is assumed that in order to withdraw money using an ATM or pass through an entrance to a premises, the user carries portable devices capable of identifying user identity and is located in an area in which the user authentication apparatus 100 can operate.

Referring to FIG. 2, a user carries personal portable devices capable of identifying user identity, including a cell phone 10, a watch 20, an RFID card 30, a portable media player (PMP) 40, and a laptop computer 50. The user authentication apparatus 100 collects user information regarding the user from the cell phone 10, the watch 20, the RFID card 30, the PMP 40, and the laptop computer 50, and may determine that the user requesting user authentication is the person himself since the number, i.e., 5 of personal portable devices from which the user information are obtained is larger than a predetermined value.

In the meantime, referring to FIG. 3, a user tries to receive user authentication using a cell phone of another person, a watch 20, and an RFID card 30. Since the user authentication apparatus 100 obtains user information regarding only the user from the watch 20 and the RFID card 3, and there are only two personal portable devices from which the user information is obtained, the user authentication apparatus 100 may determine that the collected amount of the user information is insufficient. In this case, the user authentication apparatus 100 may request personal portable devices to obtain additional user information or the user to provide additional user information. Therefore, although a personal portable device of the user may be lost and used by another person, unauthorized access of the other person can be prevented.

In the exemplary embodiment of the present invention described with reference to FIGS. 1 to 3, user authentication is performed using a plurality of portable devices of the user, but user authentication is not limited thereto. User authentication may be performed by a combination of this method using a plurality of portable devices of the user and a conventional method using an identification and a password, and may also be performed by a combination of this method using a plurality of portable devices of the user and a conventional method using a magnetic card.

Figure 4:
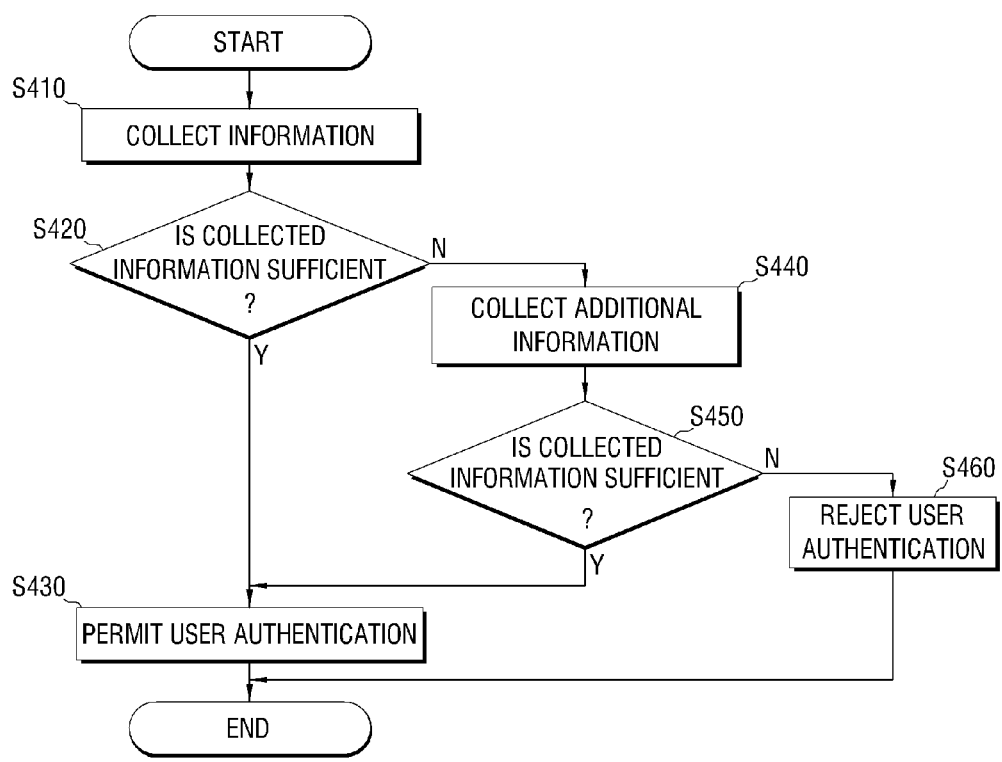
FIG. 4 is a flowchart illustrating a user authentication method according to an exemplary embodiment of the present invention.

FIG. 4 is a flowchart illustrating a user authentication method according to an exemplary embodiment of the present invention.

The user authentication apparatus 100 collects user information from a plurality of personal portable devices within a predetermined distance (S410). More specifically, if there is a person within a detectable coverage area of the user authentication apparatus 100, the user authentication apparatus 100 searches for personal portable devices within the detectable coverage area and collects user information from the personal portable devices using a short range communication scheme such as radio frequency identification (RFID), Bluetooth, and Zigbee.

If the user information is collected, the authentication apparatus 100 identifies the user based on the amount of the collected user information (S420). More specifically, it is determined whether or not the collected user information is obtained from a personal portable device belonging to the user being identified. If the amount of the collected user information is larger than a threshold value, the authentication apparatus 100 identifies the user as a user corresponding to the collected user information.

The amount of collected information may be determined by applying a weight to the amount of corresponding user information according to the characteristic of a device from which the corresponding user information is collected. For example, in the case of a personal portable device having high dependence on the user, a high weight is applied, and in the case of a personal portable device having low dependence on the user, a low weight is applied. Thus, the user may be identified according to the determination of whether or not the sum of the weight applied information is higher than a predetermined value.

Subsequently, user authentication is performed by identifying pre-stored user authentication information representing whether or not there is permission for the identified user (S430). Alternatively, whether to authenticate an operation requested by the user may be determined based on the amount of the collected information and the collected information instead of based on pre-stored information.

If the amount of the collected user information is not larger than the threshold value, the authentication apparatus 100 may request additional user information to the user (S440). If the user provides the authentication apparatus 100 with additional user information, the amount of user information may be determined based on the additional user information and the existing user information (S450). The additional user information may be obtained using information on a conventional identification and password as well as from additional personal portable devices. If additional user information may not be obtained, the authentication apparatus 100 rejects user authentication and finishes the operation (S460).

As described above, since user authentication is performed using personal portable devices usually carried by the user, the user does not need to separately carry an authentication key or a card key for authentication and thus user authentication is performed simply and rapidly over short range communications. Consequently, a user authentication method according to the exemplary embodiment of the present invention may increase convenience.

According to another exemplary embodiment of the present invention, there is provided a computer-readable recording medium that may include at least one execution program in order for the user authentication apparatus 100 or a processor to execute the exemplary user authentication method. Accordingly, each block of the present invention may be executed as a computer-recordable code of the computer-readable recording medium.

The computer-readable recording medium may be a device capable of storing data which can be read by a computer system. For example, the computer-readable recording medium may be a read-only memory (ROM), a random-access memory (RAM), a compact disc (CD)-ROM, a magnetic tape, a floppy disc, an optical disc, an optical data storage device, or an image display device such as a television including a storage device. The computer-recordable code may be executed as a computer data signal of a carrier wave.

As can be appreciated from the above description, user authentication can be easily performed using personal portable devices of a user, resulting in increased user convenience.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A user authentication apparatus, comprising:
an information collection unit which collects information for user authentication from a plurality of portable devices in a vicinity of the user authentication apparatus; and
a control unit which verifies whether each of the plurality of portable devices, based on the collected information, is a portable device predetermined for user authentication, and authenticates a user based on an amount of information of the plurality of portable devices verified by the control unit,
wherein the collected information includes information on the user of the portable devices and the portable device identification information, and
wherein the control unit identifies the user as a user corresponding to the collected information if the amount of information collected is larger than a threshold value and the plurality of portable devices include the portable device predetermined to be indispensible for user authentication.

2. The user authentication apparatus according to claim 1, wherein the information collection unit collects the information using at least one of radio frequency identification (RFID), Bluetooth, and Zigbee.

3. The user authentication apparatus according to claim 1, wherein the information for user authentication is the same information on the user which the plurality of portable devices share in common, or information on the user which the plurality of portable devices have individually.

4. The user authentication apparatus according to claim 1, wherein the information collection unit automatically collects the information from the plurality of portable devices within a detectable coverage area of the user authentication apparatus.

5. The user authentication apparatus according to claim 1, wherein the control unit applies a weight to the amount of corresponding information according to characteristics of a portable device from which the information is collected.

6. The user authentication apparatus according to claim 1, further comprising a user interface unit which requests additional information if the amount of information collected is not larger than a threshold value.

7. The user authentication apparatus according to claim 1, further comprising a storage unit which stores user authentication information representing whether or not there are authentications for each user,
wherein the control unit performs user authentication by identifying the user authentication information corresponding to the identified user.

8. A user authentication method, comprising:
collecting information for user authentication from a plurality of portable devices in a vicinity of a user authentication apparatus; and
verifying whether each of the plurality of portable devices, based on the collected information, is a portable device predetermined for user authentication and authenticating a user based on an amount of information of the plurality of portable devices verified by a control unit,
wherein the collected information includes information on the user of the portable devices and the portable device identification information, and
wherein the user is identified as a user corresponding to the collected information if the amount of information collected is larger than a threshold value and the plurality of portable devices include the portable device predetermined to be indispensible for user authentication.

9. The user authentication method according to claim 8, wherein the information for user authentication is collected using at least one of radio frequency identification (RFID), Bluetooth, and Zigbee.

10. The user authentication method according to claim 8, wherein the information for user authentication is the same information on the user which the plurality of portable devices share in common, or information on the user which the plurality of portable devices have individually.

11. The user authentication method according to claim 8, wherein the information for user authentication is automatically collected from the plurality of portable devices within a detectable coverage area of the user authentication apparatus.

12. The user authentication method according to claim 8, wherein in identifying the user, a weight is applied to the amount of corresponding information according to characteristics of a portable device from which the information is collected.

13. The user authentication method according to claim 8, further comprising requesting additional information if the amount of information collected is not larger than a threshold value.

14. The user authentication method according to claim 8, further comprising performing user authentication by identifying user authentication information, representing whether or not there are authentications, corresponding to the identified user.

15. A non-transitory computer-readable recording medium comprising an execution program for executing a user authentication method, wherein the user authentication method comprises:
   collecting information for user authentication from a plurality of portable devices in a vicinity of a user authentication apparatus; and
   verifying whether each of the plurality of portable devices, based on the collected information, is a portable device predetermined for user authentication and authenticating a user based on an amount of information of the plurality of portable devices,
   wherein the collected information includes information on the user of the portable devices and the portable device identification information, and
   wherein the user is identified as a user corresponding to the collected information if the amount of information collected is larger than a threshold value and the plurality of portable devices include the portable device predetermined to be indispensible for user authentication.

16. The non-transitory computer-readable recording medium according to claim 15, wherein in identifying the user, a weight is applied to an amount of corresponding information according to characteristics of a portable device from which the information is collected.

17. The non-transitory computer-readable recording medium according to claim 15, wherein the user authentication method further comprises performing user authentication by identifying user authentication information, representing whether or not there is permissions, corresponding to the identified user.

18. The non-transitory computer-readable recording medium according to claim 15, wherein the user authentication method further comprises requesting additional information if the amount of information collected is not larger than a threshold value.

19. The user authentication apparatus according to claim 1, wherein the portable device is at least one of a cell phone, an RFID card, an Portable Media Player, a laptop computer and accessory.

20. The user authentication apparatus according to claim 1, wherein the control unit authenticates the user as a user corresponding to the collected information if the number of indispensible information is plural.

21. The user authentication apparatus according to claim 1, wherein the control unit authenticates the user based on a number of the predetermined devices verified by the control unit.

* * * * *